(12) United States Patent
Kisielewski et al.

(10) Patent No.: US 8,366,793 B2
(45) Date of Patent: Feb. 5, 2013

(54) METHOD OF DECARBONATION AND ITS USE IN PRODUCING CRYSTALLINE SODIUM SULFITE OR OTHER ALKALI PRODUCTS

(75) Inventors: Jim Kisielewski, Green River, WY (US); Donald M. Robertson, Green River, WY (US); Robert N. Skogley, Missoula, MT (US)

(73) Assignee: Solvay Chemicals, Inc., Houston, TX (US)

( * ) Notice: Subject to any disclaimer, the term of this patent is extended or adjusted under 35 U.S.C. 154(b) by 455 days.

(21) Appl. No.: 12/741,983

(22) PCT Filed: Nov. 12, 2008

(86) PCT No.: PCT/EP2008/065428
§ 371 (c)(1),
(2), (4) Date: May 7, 2010

(87) PCT Pub. No.: WO2009/062984
PCT Pub. Date: May 22, 2009

(65) Prior Publication Data
US 2010/0239477 A1    Sep. 23, 2010

Related U.S. Application Data

(60) Provisional application No. 60/987,291, filed on Nov. 12, 2007.

(51) Int. Cl.
*C01D 5/00* (2006.01)
(52) U.S. Cl. .................................. 23/302 T; 23/295 R
(58) Field of Classification Search ................. 23/302 T, 23/295 R
See application file for complete search history.

(56) References Cited

U.S. PATENT DOCUMENTS

| | | | |
|---|---|---|---|
| 1,937,944 A | 12/1933 | Butler | |
| 2,080,528 A | 5/1937 | Bowman et al. | |
| 2,245,697 A | 6/1941 | Melendy | |
| 2,719,075 A | 9/1955 | Allen | |

FOREIGN PATENT DOCUMENTS

| | | | |
|---|---|---|---|
| FR | 2534571 A1 | 4/1984 | |
| GB | 485215 A | 5/1938 | |
| GB | 1520698 A | 8/1978 | |

OTHER PUBLICATIONS

R.H. Perry, D.W. Green : Perry's Chemical Engineers Handbook (7th Edition) 1997, McGraw Hill, pp. 18-45, 18-46, 18-49, 18-50—XP002519729.

*Primary Examiner* — Edward Johnson
(74) *Attorney, Agent, or Firm* — Beatrice C. Ortego

(57) ABSTRACT

A sodium sulfite liquor is formed by reacting sodium carbonate with sulfur dioxide. A $CO_2$ byproduct may be removed from the formed liquor by injecting a stripping gas (e.g., steam and/or air) into the liquor, either into a transfer pipe or into a tank that is vented; by increasing the liquor temperature; and/or by reducing the liquor pressure. The decarbonated sodium sulfite liquor with a reduced carbon dioxide content is introduced into a crystallizer connected to a circulation loop comprising a heater and/or a filter. Additional decarbonation by heating, stripping and/or depressurization of the liquor may be carried out in a circulation loop connected to the crystallizer. The condensing side of the heater may be vented. The flow rate of the circulation loop and/or heater temperature differences may be monitored. Additional $CO_2$ may be vented from a holding tank to maintain circulation loop flows and heater temperature differences.

20 Claims, 5 Drawing Sheets

METHOD OF DECARBONATION AND ITS USE IN PRODUCING CRYSTALLINE SODIUM SULFITE OR OTHER ALKALI PRODUCTS

CROSS-REFERENCE TO RELATED APPLICATIONS

The present application is a U.S. national stage application under 35 U.S.C. §371 of International Application No. PCT/EP2008/065428 filed Nov. 12, 2008, which claims the benefit of U.S. Provisional Application Ser. No. 60/987,291 filed Nov. 12, 2007, each of these applications being herein incorporated by reference in its entirety for all purposes.

TECHNICAL FIELD OF THE INVENTION

The present invention relates to methods of decarbonation and its use in producing crystalline alkali products, particularly crystalline sodium sulfite.

BACKGROUND

Sodium sulfite has a variety of commercial uses such as a disinfectant or bleaching (decoloring) agent for fabrics and paper. It is also used as a preservative in food.

Sodium sulfite ($Na_2SO_3$) can be manufactured in a number of ways. Commonly, sodium sulfite is crystallized from a solution of sodium sulfite. Sodium sulfite can be prepared by reacting sulfur dioxide ($SO_2$) in an aqueous, alkaline solution, such as solutions of sodium hydroxide, also known as caustic soda (NaOH), or sodium carbonate ($Na_2CO_3$). Sodium sulfite can react with sulfur dioxide to produce sodium bisulfite. When sodium carbonate is used as a reactant, carbonic acid ($H_2CO_3$) is a by-product of the reaction. The carbonic acid evolves as carbon dioxide ($CO_2$). The sodium sulfite liquor formed by reaction is pumped to an evaporative crystallizer, where the sodium sulfite is crystallized. These crystals are removed from the crystallizer and dried in a rotary dryer.

A variety of processes have been disclosed for producing sodium sulfite.

U.S. Pat. No. 2,245,697: entitled "Manufacture of alkali metal sulfites," discloses a process for making sodium sulfite and teaches that water vapor and air introduced into the reactor as diluent in the $SO_2$ feed is vented out along with $CO_2$ that is present in appreciable amounts under certain acidic reactor conditions. The patent also teaches that the liquor is "gassed" with $SO_2$ feed so that all of the CO2 is "expelled."

U.S. Pat. No. 2,080,528: entitled "Process of manufacturing anhydrous sodium sulfite," discloses reacting sodium carbonate with sulfur dioxide to make a sodium sulfite liquor that is then boiled to remove residual $CO_2$ gas.

U.S. Pat. No. 2,719,075: entitled "Purification of alkali metal sulfite liquors." discloses introducing air into a sodium bisulfite liquor to remove $CO_2$.

U.S. Pat. No. 1,937,944: entitled "Manufacture of sulphites," discloses a process for manufacturing sodium sulphite from sodium carbonate and sulfur dioxide and teaches that the reactor liquor is circulated in the absorbing tower until all the $CO_2$ has "passed off."

Great Britain Patent No. GB485215: entitled "Process of manufacturing anhydrous sodium sulfite," teaches that, in a sodium sulfite manufacturing process, caustic soda is added prior to crystallization to remove iron impurities.

France Patent No. FR2534571: entitled "Process and device for production of sodium and potassium sulfite," teaches the use of heat transfer equipment in the consecutive preparation of $Na_2SO_3$, $NaHSO_3$, and $Na_2S_2O_5$.

Even with the teachings of these patents concerning the various sodium sulfite processes, these disclosures do not recognize nor address the operational and maintenance issues that may occur in heaters associated with commercial-scale sodium sulfite crystallizers. Indeed, fouling of the crystallizer heater can occur so frequently that periodic cleanouts of the system, e.g., use of hydroblasting services, are necessary. Applicants have observed that fouling is especially increased with the use of sodium carbonate as a reactant compared to caustic soda.

Thus, there is a need for process modifications to reduce equipment fouling in a sodium sulfite manufacturing process.

It would be advantageous to modify a process for manufacturing a crystalline alkali product from a liquor, in which a liquor component (e.g., a reactant, an end product, and/or a by-product) may be liberated in gaseous form from the liquor during crystallization, to reduce the operational costs of downtime, increase production rates and reduce the frequency of cleaning out fouled process equipment.

SUMMARY OF THE INVENTION

In a first embodiment, the present invention relates to a method for decarbonating a liquor comprising carbon dioxide ($CO_2$) and a desired alkali product, wherein the liquor serves as a feed to a crystallization system for forming crystals of said desired alkali product, the crystallization system comprising a crystallizer, a crystallizer heater in a first circulation loop connected to the crystallizer, a circulation pump, and optionally a filter in a second circulation loop connected to the crystallizer or the crystallizer heater. According to this embodiment, the method comprises reacting two reactants, preferably one of which comprises a carbonate compound, under conversion promoting conditions in a reactor to form a desired alkali product and $CO_2$ so as to generate a liquor comprising the desired alkali product and at least a portion of the formed $CO_2$, the liquor having a temperature and a pressure when exiting said reactor; and performing at least one decarbonation technique selected from the group consisting of:

a) passing a stripping gas through the liquor or a portion of the liquor to remove at least a portion of $CO_2$ in order to decrease the $CO_2$ content of the liquor, so as to form a vent gas comprising $CO_2$, wherein the stripping gas excludes sulfur dioxide, the step (a) being carried out prior to loading the liquor into the crystallizer, or while passing the liquor through the first circulation loop, through the second circulation loop, or through both circulation loops;

b) increasing the temperature of the liquor by 5° F. or more, the step (b) being carried out prior to loading the liquor into the crystallizer, or while passing the liquor through the first circulation loop, through the second circulation loop, or through both circulation loops;

c) decreasing the pressure of the liquor, the step (c) being carried out prior to loading the liquor into the crystallizer, or while passing the liquor through the first circulation loop, through the second circulation loop, or through both circulation loops;

d) venting a condensing side of the crystallizer heater, while passing the liquor through the first circulation loop; and e) any combinations of two or more of these techniques thereof.

In some embodiments of the method of decarbonation, the desired alkali product in the liquor is sodium sulfite.

In some embodiments of the method of decarbonation, the stripping gas in step (a) comprises steam, air, or any mixtures thereof.

In the method of decarbonation, the step (a) may be carried out by injecting a stripping gas into a transfer pipe containing at least a portion of the liquor, or by injecting a stripping gas into a vessel containing at least a portion of the liquor. The transfer pipe may be in fluid communication with at least one of the following equipment: a liquor feed tank, a liquor surge tank; the crystallizer; the crystallizer heater; the filter; or a circulation pump in the first or second circulation loop.

In the method of decarbonation, the step (b) may be carried out by increasing the liquor temperature to a temperature not exceeding the saturation point. In some embodiments, the step (b) is carried out by performing a technique selected from the group consisting of: heating the liquor in a liquor pre-heater; passing a hot gas through the liquor; heating the liquor in a liquor pre-heater, and then passing a hot gas through the liquor; and passing a hot gas through the liquor, and then heating the liquor in a liquor pre-heater.

The method of decarbonation may further comprise monitoring a circulation flow rate of the liquor in the first circulation loop and the temperatures of the liquor entering and exiting the crystallizer heater; comparing the circulation flow rate and the difference in these temperatures within their respective pre-determined ranges of values; and when the circulation flow rate and/or the difference in these temperature are not within their respective pre-determined ranges, performing more than one decarbonation steps (a) to (d), or increasing the rate of decarbonation while performing any decarbonation steps chosen from steps (a) to (d). The step of increasing the rate of decarbonation may be carried out by a technique selected from the group consisting of: increasing the flow rate of the stripping gas in step (a); increasing the heat transfer rate in step (b); increasing the pressure drop in step (c); increasing the flow rate of the venting of the condensing side in step (d); and any combinations of two or more of these techniques thereof.

In a second embodiment, the present invention relates to a method for minimizing pump cavitation in a process for producing a crystalline alkali product from a liquor, wherein the liquor serves as a feed to a crystallization system comprising a crystallizer connected to a circulation loop comprising a circulation pump. According to this embodiment, the method comprises performing at least one decarbonation technique as described above.

In a third embodiment, the present invention relates to a method for minimizing fouling of a crystallizer heater in a process for producing a crystalline alkali product from a liquor, wherein the liquor serves as a feed to a crystallization system comprising a crystallizer connected to a circulation loop comprising the crystallizer heater. According to this embodiment, the method comprises performing at least one decarbonation technique as described above.

In a fourth embodiment, the present invention relates to a process for producing a crystalline metal sulfite, comprising providing a liquor comprising a metal sulfite and $CO_2$, and carrying out the method for decarbonating the liquor as described above.

The process for producing a crystalline metal sulfite further comprises: loading the liquor in the crystallizer under conditions suitable to form metal sulfite crystals; passing at least a portion of the liquor disposed in the crystallizer through the crystallizer heater in the first circulation loop to form a recycled heated liquor which is returned, at least in part, to the crystallizer and to further form a condensate which exists the first circulation loop; and removing metal sulfite crystals from the crystallizer.

In such process, the step of providing the liquor may comprise reacting an aqueous solution of a metal carbonate with sulfur dioxide under conversion promoting conditions to form a desired metal sulfite and carbon dioxide ($CO_2$) so as to generate the liquor comprising the formed metal sulfite and at least a portion of the formed $CO_2$.

In a fifth embodiment, the present invention relates to a method for producing sodium sulfite. Such method includes reacting an aqueous solution of sodium carbonate with sulfur dioxide under conversion promoting conditions to form a reaction product comprising sodium sulfite in an aqueous feed liquor, introducing the sodium sulfite liquor into a feed tank, performing at least one decarbonation technique to form a decarbonated liquor, the decarbonation technique being selected from the group consisting of: a/ introducing a stripping gas comprising steam, air or mixtures thereof into the sodium sulfite liquor in the feed tank, and venting gasses including carbon dioxide from the feed tank; b/ heating the sodium sulfite liquor; c/ decreasing the pressure of the sodium sulfite liquor; and any combinations of two or more of these techniques thereof; introducing the decarbonated sodium sulfite liquor into a sodium sulfite crystallizer; circulating the crystallizer liquor through a crystallizer heater in a crystallizer circulation loop; venting a condensing side of the crystallizer heater, monitoring the temperature increase of the recirculating liquor exiting the crystallizer heater, and removing sodium sulfite crystals from the crystallizer. Optionally, the method for producing sodium sulfite includes monitoring the flow rate of a condensate exiting the crystallizer heater and monitoring the temperatures of the circulating liquor entering and exiting the crystallizer heater, and when the condensate flow rate decreases below a pre-determined value or when the difference in these temperatures exceeds a threshold limit, then the method further comprises increasing the amount of carbon dioxide removed from the liquor during the decarbonation step.

According to a sixth embodiment, a method for producing sodium sulfite comprises: reacting an aqueous solution of sodium carbonate with sulfur dioxide under conversion promoting conditions to form a reaction product comprising a sodium sulfite liquor comprising carbon dioxide; introducing the sodium sulfite liquor into a feed tank; performing at least one decarbonation technique to form a decarbonated liquor; introducing the decarbonated sodium sulfite liquor into a crystallizer; circulating liquor through a crystallizer heater in a crystallizer circulation loop; venting a condensing side of the crystallizer heater; removing sodium sulfite crystals from the crystallizer; monitoring the flow rate of a condensate exiting the crystallizer heater; and monitoring the temperatures of the circulating liquor entering and exiting the crystallizer heater; and wherein, when the condensate flow rate decreases by a pre-determined amount or when the difference in these temperatures exceeds a threshold limit, the method further comprises increasing the amount of carbon dioxide removed from the liquor during the decarbonation step.

BRIEF DESCRIPTION OF THE DRAWINGS

For a detailed description of the preferred embodiments of the invention, reference will now be made to the accompanying drawings in which.

Figure 1:
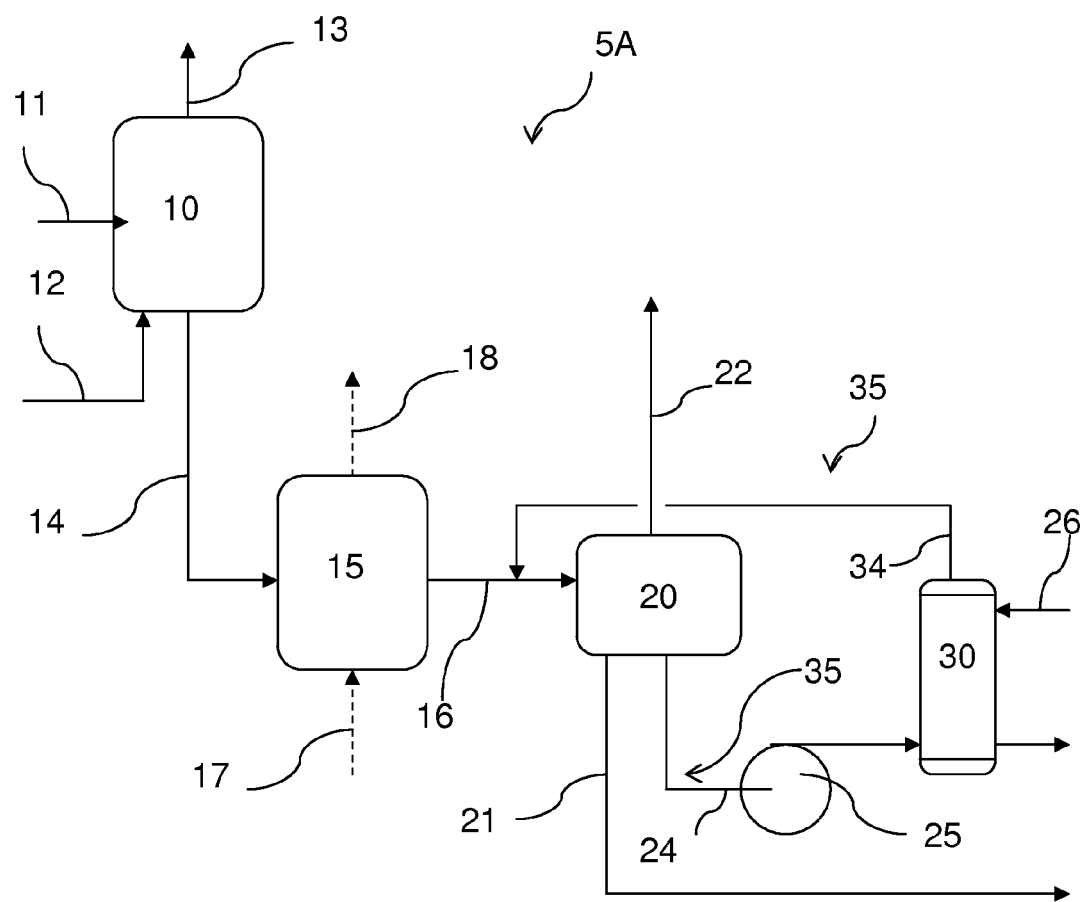
FIG. 1 illustrates a process flow diagram of a first embodiment of a process for making an alkali product, wherein the process includes a decarbonation step prior to a crystallization step.

DETAILED DESCRIPTION OF THE DRAWINGS AND THE PREFERRED EMBODIMENTS OF THE INVENTION

Units, prefixes, and symbols may be denoted in their SI accepted form. Numeric ranges recited herein are inclusive of the numbers defining the range and include and are supportive of each integer within the defined range. Unless otherwise noted, the terms "a" or "an" are to be construed as meaning "at least one of." The section headings used herein are for organizational purposes only and are not to be construed as limiting the subject matter described. All documents, or portions of documents, cited in this application, including but not limited to patents, patent applications, articles, books, and treatises, are hereby expressly incorporated by reference in their entirety for any purpose.

In a brief overview, sodium sulfite may be manufactured commercially by preparing a sodium sulfite liquor by the reaction of sodium carbonate with sulfur dioxide in a reactor. The reaction produces sodium sulfite with carbon dioxide ($CO_2$) as a by-product. The reactor liquor is then fed to a crystallization system, which includes a crystallizer and a crystallizer heater in a heater circulation loop connected to the crystallizer. The liquor is moved by the help of a circulating pump in the heater circulation.

In commercial-scale sodium sulfite crystallizers however, fouling of the crystallizer heater normally occurs, so that periodic cleanouts of the system are necessary. In the case of sodium sulfite crystallization from sodium sulfite slurry prepared using sodium carbonate, additional fouling occurs if the liquor still contains some amount of carbon dioxide. Indeed, it has been found that, as carbon dioxide concentrations increase in the crystallizer, the carbon dioxide partial pressure increases, resulting in the cavitation of the circulating pump and in a decrease in pumping flowrate through the crystallizer heater. Increased residence times due to decreased flowrates through the crystallizer heater can result in the temperature of the sodium sulfite slurry to exceed the boiling point for the water in the sodium sulfite slurry, causing rapid crystallization within the crystallizer heater. Normally, the sodium sulfite slurry is heated to a temperature that exceeds the boiling point of water at the crystallizer liquid surface, but less than the elevated boiling point in the heater. The elevated boiling point is due to the pressure exerted from the liquid head on the crystallizer heater. In a shell-and-tube heat exchanger design, the rapid crystallization plugs the heater tubes with crystals, thus reducing production rates and requiring frequent system cleanouts. Hydroblasting of the heater tubes, requiring down time, is necessary to restore the crystallizer heater to normal operating condition.

In previous processes, the liquor feeding the crystallizer is not conditioned by a decarbonation step. One advantage of the invention is that it offers a solution to the problems of circulating pump cavitation and crystallizer heater fouling which result in reduced production and frequent equipment cleanout. The solution offered by the present invention comprises a method for decarbonating the liquor prior to being loaded into the crystallizer and/or while the liquor passes through equipment in a circulation loop connected to the crystallizer. The removal of the liquor component which is easily liberated as gas under crystallization conditions prior to being loaded into the crystallizer and the prevention of accumulation of this liberated gas during crystallization, either independently or together, aim at eliminating the source of the circulation pump cavitation. By maintaining proper circulation flow, the crystallizer heater does not become fouled due to increased heater residence times and elevated temperatures.

Preferred embodiments of the present invention relate to a method of degassing a liquor or a slurry which comprises a desired product to be crystallized and an undesirable component which is easily liberated as a gas under crystallization conditions.

Particular embodiments of the present invention relate to a method of removing $CO_2$ from a liquor or a slurry containing $CO_2$ and a desired alkali product, in which the decarbonated liquor or slurry is fed to a crystallizer to recover crystals of the desired alkali product.

In some embodiments, the undesirable component in the liquor or slurry may be an unconverted reactant, an end product, or a by-product resulting from a reaction. The undesirable liquor component is generally considered undesirable because it can be easily liberated as gas under crystallization conditions. The undesirable liquor component may be in dissolved and/or in entrapped gaseous form in the liquor. The term 'entrapped' is meant to cover small gas bubbles which are in suspension into the liquor. The desired alkali product may be an end product or a by-product of the reaction, and this desired alkali product may be in dissolved and/or solid form in the liquor.

In preferred embodiments, the undesirable liquor component may be $CO_2$ which is a by-product of a reaction between an alkali or alkali earth metal carbonate and $SO_2$. The desired alkali product may be an alkali or alkali earth metal salt.

In more preferred embodiments, the undesirable liquor component may be $CO_2$ which is a by-product of a reaction between sodium carbonate and $SO_2$; and the desired alkali product may be sodium sulfite or sodium bisulfite.

In additional or alternate embodiments, the present invention relates to a method for minimizing pump cavitation and/or a method for minimizing fouling of a crystallizer heater in a process for producing a crystalline alkali product from a liquor, wherein the liquor serves as a feed to a crystallization system comprising a crystallizer connected to a circulation loop comprising a circulation pump and a crystallizer heater.

According to such embodiments, the method for minimizing pump cavitation and/or heater fouling comprises performing at least one decarbonation technique being carried out prior to loading the liquor into the crystallizer and/or while passing the liquor through the circulation loop.

The invention will now be described with reference to the drawings.

The following description hereinafter will refer to '$CO_2$' as the undesirable liquor component and to 'decarbonation' as a means by which this undesirable component is removed from the liquor. However, it should be understood that the description of the present invention is applicable to any undesirable component of a liquor or slurry which can be easily liberated as gas under crystallization conditions. In a similar manner, it should be understood that the method for removing $CO_2$ described herein can also be applied for the removal of any undesirable liquor component which can be easily liberated as gas under crystallization conditions.

FIG. 1 is a schematic process flow diagram which comprises an apparatus 5A for carrying out the manufacture of a desired crystalline product. The desired crystalline product is preferably a crystalline alkali metal or alkali earth metal salt, such as crystalline sodium sulfite.

The system 5A comprises a reactor 10, a decarbonation unit 15, a crystallization system comprising a crystallizer 20, a circulation pump 25 and a crystallizer heater 30. The circulation pump 25 and a crystallizer heater are located in a first circulation loop 35, also known as 'heater circulation loop' or 'crystallizer recirculation loop'.

Reactor 10 generally has first and second reactant inlets, a liquor outlet, and a gas effluent outlet.

The crystallizer 20 preferably includes an evaporative crystallizer operated under vacuum. The crystallizer 20 generally includes a liquor feed inlet connected to line 16, a crystal slurry outlet connected to line 21, and a steam outlet connected to line 22. The crystallizer 20 may include a liquor circulation loop outlet as shown connected to line 21. The crystallizer 20 may further include a liquor circulation loop return inlet.

The heater circulation loop 35 is in fluid communication at a first end with the liquor circulation loop outlet of the crystallizer 20 and at a second end the crystallizer 20 (e.g., via the liquor circulation loop return inlet, not shown, or via a return line 34 merging into liquor feed line 16, as shown in FIG. 1).

Reactor 10 may comprise suitable operating conditions for the conversion of two reactants for the production of a desired alkali product, wherein the reactants are entering the reactor 10 via the first and second reactant inlets. For example, in some non-limiting embodiments, reactor 10 may comprise conversion promoting conditions for the manufacture of a desired alkali product liquor by the reaction of two reactants, preferably one of which comprises a carbonate compound, under conversion promoting conditions to form the desired alkali product and $CO_2$ so that the generated liquor comprises the desired alkali product and at least a portion of the formed $CO_2$. In some particular embodiments, reactor 10 may comprise conversion promoting conditions effective in the manufacture of an alkali salt liquor by the reaction of an alkali metal or alkali earth metal carbonate (e.g., line 11) with sulfur dioxide (e.g., via line 12). In preferred embodiments, the reactor 10 comprises conversion promoting conditions effective in the manufacture of a sodium sulfite liquor by the reaction of sodium carbonate (e.g., line 11) with sulfur dioxide (e.g., via line 12) concurrent with the formation of $CO_2$ as a by-product, so that the sodium sulfite liquor comprises at least a portion of the formed $CO_2$.

The decarbonation unit 15 may include a vessel configured to receive and vent a stripping gas. The decarbonation vessel may be equipped with a gas distribution system (not shown in FIG. 1 but illustrated for example in units 115 and 125 in FIG. 4). The gas distribution system may comprise a sparger, one or more nozzles, or combinations thereof, disposed at or near the bottom of the vessel. The gas distribution system provides distribution of the stripping gas to improve its effectiveness in displacing dissolved and/or entrapped $CO_2$ out of the liquor medium (e.g., water). The decarbonation unit 15 generally includes a liquor feed inlet and a liquor outlet. The decarbonation unit 15 may include a sparging gas inlet connected to the gas distribution system, and a vent gas outlet for passing the stripping gas carrying $CO_2$ out of the vessel.

The decarbonation unit 15 may comprise a liquor feed tank, a liquor surge tank, the same vessel as reactor 10; or the crystallizer 20; or may comprise more than one vessel. Alternatively or additionally, the decarbonation unit 15 may comprise a liquor feed pre-heater, such as a heat exchanger configured to increase the temperature of the liquor. Alternatively or additionally, the decarbonation unit 15 may comprise an expander or a vacuum apparatus configured to decrease the pressure of the liquor, such as an expansion valve, a barometric condenser, a venturi, a spray nozzle, or any combinations of two or more thereof.

The circulating pump 25 in the heater circulation loop 35 pumps the liquor through the crystallizer heater 30 to transfer the heat needed for evaporation into the liquor, and is also used to move at least a portion of the liquor exiting the crystallizer heater 30 back to the crystallizer 20. The crystallizer heater 30 is preferably a shell-and-tube heat exchanger.

The crystallizer heater 30 is in fluid communication with the circulating pump 25, and is adapted to receive at least a portion of the liquor from the crystallizer 20 to pass through the tubes of the crystallizer heater 30.

The loop 35 is further adapted to return heated liquor exiting the heater 30 via line 34 to the crystallizer 20. The crystallizer heater 30 is also adapted to receive steam via line 26 which condenses as it passes through the crystallizer heater 30 on the shell side, wherein the steam is able to provide some heat necessary to maintain the liquor temperature with a pre-determined range of values.

A process for manufacturing a crystalline alkali product from a liquor is carried out in the apparatus 5A illustrated in FIG. 1. This process includes a method for degassing of the liquor which is carried out in the decarbonation unit 15 before the liquor is fed to the crystallization system. The process steps are described as follows.

A first reactant in line 11 and a second reactant in line 12 are fed to the reactor 10 under conversion promoting conditions sufficient for the reaction of these reactants to form a desired alkali product. The conversion promoting conditions may be also favorable for forming an undesirable compound (as end product or by-product) so that a liquor comprising the desired alkali and at least a portion of the formed undesirable compound is generated. The undesirable compound preferably comprises carbon dioxide ($CO_2$). $CO_2$ in the liquor may be in dissolved form, in entrapped gaseous form, or both.

An off-gas may exit the reactor 10 in line 13. This off-gas may contain one or both of the two unconverted reactants in gaseous form and/or may contain some of the formed $CO_2$.

The liquor so generated by the reaction in the reactor 10 exits the reactor 10 via line 14, and is directed to the decarbonation unit 15. The liquor entering the decarbonation unit 15 via line 14 is then subjected to a method of decarbonation prior to being fed via line 16 to the crystallizer 20. The decarbonation method is effective in decreasing the $CO_2$ content of the liquor so that the liquor in line 16 is leaner in $CO_2$ content than the liquor in line 14.

a) The decarbonation method may include at least on of the following steps: a/passing a stripping gas (e.g., in line 17) through the liquor disposed in or passing through the decarbonation unit 15 to remove at least a portion of the $CO_2$ dissolved and/or entrapped in this liquor so as to form a vent gas comprising $CO_2$ which exits the decarbonation unit 15 (e.g., via line 18);

b) increasing the temperature of the liquor disposed in or passing through the decarbonation unit 15;

c) decreasing the pressure of the liquor disposed in or passing through the decarbonation unit 15; or any combinations of two or more of these techniques thereof. The increase in temperature in step (b) and the decrease in pressure in step (c) are with respect to the temperature and pressure of the liquor at the exit of the reactor 10. That is to say, the temperature and pressure of the liquor exiting the reactor 10 serve as a basis for the change in pressure or temperature of the liquor during decarbonation.

The decarbonation method should be effective in removing at least 10% of the $CO_2$ from the liquor, preferably at least 25% of the $CO_2$ from the liquor, or at least 50% of the $CO_2$ from the liquor. In some embodiments, more than 80% of the $CO_2$ is removed from the liquor when it is subjected to one or more decarbonation techniques.

Alternatively or additionally, the decarbonation method may be effective in reducing the $CO_2$ content of the liquor by at least 10%, preferably by at least 20%, or by at least 30%, or by at least 50%. In some embodiments, the $CO_2$ content of the liquor is reduced by at least 80% after the liquor has been subjected to one or more decarbonation techniques.

When the decarbonation method in unit 15 comprises stripping the liquor with the stripping gas, the stripping gas acts to displaces at least a portion of the $CO_2$ from the liquor and carries this $CO_2$ portion out of the decarbonation unit. The minimum pressure of the stripping gas being injected into the liquid contained in the unit 15 should be high enough to overcome the head pressure of the liquid present in the unit 15. For example in a 20-feet (6-meter) tall tank serving as decarbonation unit 15, the minimum pressure of the stripping gas would be 10 psig (about 170 kPa).

The maximum pressure of the stripping gas being injected into the liquid contained in decarbonation unit 15 should would be limited by the geometry of the decarbonation vessel, such that its pressure would be low enough not to force the liquor out of the decarbonation vessel.

The stripping gas may comprise a gas selected from the group consisting of air, steam, nitrogen, any inert gas (e.g., argon, neon, . . . ), a light hydrocarbon gas (e.g., methane, ethylene, ethane, propane, or natural gas), and any combinations of two or more of these gases thereof. Preferably, the stripping gas may comprise or consist essentially of a gas selected from the group consisting of air, steam, nitrogen, and any combinations of two or more of these gases thereof. In some embodiments, the stripping gas may comprise, or may consist essentially of, a mixture of steam and air.

Preferably, the stripping gas does not include a reactant in gaseous form. For example, in embodiments when one of the reactants (via line 11 or 12) fed to the reactor 10 is sulfur dioxide ($SO_2$), the stripping gas excludes $SO_2$. In some embodiments, the stripping gas may comprise, or may consist essentially of, a gas selected from the group consisting of air, steam, and any combinations thereof.

The degree of decarbonation is influenced by the flowrate of the stripping gas. For example in a sodium sulfite process producing 50,000 tons per year, overall stripping gas flowrates may be in the order of 100-500 standard cubic feet per minute (scfm) or 170-850 standard cubic meters per hour with the stripping gas comprising a mixture of steam and air.

When the stripping gas comprises or consists essentially of steam, steam may be at a pressure ranging from 25 psig to 100 psig (about 240 to 790 kPa). For example, in an industrial setting for the manufacture of sodium sulfite for example, steam pressure of from 35 psig to 60 psig (about 340 to 515 kPa) is adequate to meet the minimum/maximum pressure criteria described above.

When the stripping gas comprises or consists essentially of air, the air may be at a pressure ranging from 75 psig to 125 psig (about 615 to 965 kPa), preferably at about 100 psig (about 790 kPa). In industrial plants, compressed air is generally available at near 100 psig (about 790 kPa).

When the decarbonation method in decarbonation unit 15 comprises increasing the temperature of the liquor, increasing the liquor temperature reduces the solubility of $CO_2$, and thus liberates $CO_2$ in gaseous form. Increasing the liquor temperature to a value slightly below or not exceeding the saturation point would provide the maximum decarbonation efficiency.

The increase of the liquor temperature for decarbonation is limited by the boiling point of the water in the liquor. That is to say, if the liquor temperature exceeds the water boiling point, then crystals will begin to form in the decarbonation unit 15, and will begin to foul it. The increase of the liquor temperature for decarbonation is also limited by the content of the desired alkali product in the liquor (e.g., sodium sulfite concentration). In the case of sodium sulfite as the desired alkali product, since sodium sulfite is less soluble at higher temperatures, an increase of liquor temperature above the sodium sulfite saturation temperature will produce crystals in the decarbonation unit 15. As an example, for a sodium sulfite concentration of 25% in the liquor, the saturation temperature is 135° F. (about 57° C.), and thus exceeding 135° F. will result in crystals formation in the decarbonation unit 15, which is not desirable at this stage of the process. Thus if the reactor 10 is operated at about 120° F. (about 49° C.), a maximum increase of 15° F. (or 8.3° C.) should be used in decarbonation unit 15 for an effective removal of $CO_2$ from the liquor while preventing premature crystallization in decarbonation unit 15.

In general, the increase in liquor temperature may be at least 5° F. (or 2.8° C.), preferably between about 5° F. and 40° F. (about 2.8-22.2° C.), more preferably between about 10° F. and 30° F. (about 5.5-16.7° C.), and most preferably between about 10° F. and 25° F. (about 5.5-13.9° C.), or alternatively between about 15° F. and 30° F. (about 8.3-16.7° C.). To increase the temperature in decarbonation unit 15, the liquor may be subjected to a direct or indirect heat exchange with a hot fluid. For example, when the increase in liquor temperature is effected by indirect heat transfer, the decarbonation unit 15 may include a heat exchanger in which the liquor and hot fluid are in heat transfer relation but not in fluid communication (such as a shell-and-tube exchanger). The hot fluid may include steam, or any suitable heat transfer medium (e.g, DOWTHERM™ heat transfer fluid, heated air).

In other embodiments, when the increase in liquor temperature may be effected by direct heat transfer, the decarbonation unit 15 may include a drum or tank or a tower for direct heat exchanger in which the liquor and a hot fluid are in heat transfer relation as well as in fluid communication.

In such case, the liquor may be heated via the hot fluid which is injected directly into the liquor. The hot fluid in such case may include steam, or any suitable hot or heated gas which is compatible with the equipment material of construction and which is preferably unreactive with the components of the liquor. The hot fluid may comprise or consist of heated nitrogen, air, any inert gas (e.g., argon, neon), or combinations thereof, preferably may comprise or consist of heated nitrogen, air, or mixtures thereof.

When the decarbonation method carried out in unit 15 comprises decreasing the pressure of the liquor, the decrease in pressure of the liquor serves to reduce the total pressure above it so that the partial pressure of $CO_2$ above the liquor is decreased and therefore the $CO_2$ concentration in the liquor is reduced. The decrease in liquor pressure thus flashes out some of $CO_2$, and liberates it in gaseous form. The pressure decrease also serves to shear the liquor through expansion, and, although without wishing to be limited by such theory, it is believed that the spray and droplets that are developed during depressurization provide a large liquid surface area for mass transfer of the dissolved $CO_2$ out of the liquor.

The drop in pressure will vary, but may be as low as 5 psi (or 34.5 kPa), or as high as about 100 psi (or about 690 kPa). The decrease in liquor pressure may be between about 30 psi and about 100 psi (or about 207-690 kPa). Preferable pressure drops may be from 30 to 50 psi (or about 207-345 kPa), or from 50 to 75 psi (or about 345-517 kPa), or from 75 to 100 psi (or about 517-690 kPa). Since, in practice, the pressure of the liquor prior to de-pressurization may be provided with a pump, with typical pump discharge pressures as high as 100 psi, the liquor may be depressurized to atmospheric pressure, in order to provide the most decarbonation benefit.

It should be noted that the decarbonation method in unit 15 may be carried out by performing, sequentially or concurrently, more than one of the steps (a), (b) and (c) as described above. For example, the decarbonation in unit 15 may be carried out by simultaneously increasing the temperature of the liquor and stripping the liquor by injecting a hot stripping gas, wherein the temperature of the hot stripping gas is greater than that of the liquor in line 14 entering the decarbonation unit 15. The hot stripping gas may have a temperature at least 5° F. higher (or at least 2.8° C. higher), or at least 10° F. (or at least 5.5° C. higher), than the liquor in line 14 entering the decarbonation unit 15. For example, in a sodium sulfite manufacture process, the hot stripping gas may have a temperature of at least 125° F. (or at least 51.6° C.), when the liquor temperature is about 120° F. (or 48.9° C.) when exiting the reactor 10. The hot stripping gas may have a temperature 50° F. higher or more than the liquor in line 14 entering the decarbonation unit 15. However, the hot stripping gas may have a much higher temperature than the liquor in line 14, so long as the resulting temperature of the heated liquor formed in unit 15 and transferred via line 16 does not exceed the saturation point where crystals begins to form.

In alternate embodiments, the decarbonation method in unit 15 may be carried out by sequentially increasing the temperature of the liquor and then stripping the liquor by injecting a stripping gas, or by sequentially stripping the liquor by injecting a stripping gas and then increasing the temperature of the liquor.

When several decarbonations techniques are carried out, they may be carried out in any order. The several decarbonations techniques may be carried out in one single vessel serving as unit 15 or in a plurality of units 15.

In some embodiments, one of the decarbonation techniques chosen from steps (a)-(c) may be carried out multiple times. For example, two or more decarbonation steps via stripping may be carried out by using stripping gases of same composition or different compositions. Such an embodiment will be described later in relation to FIG. 4.

As a non-limiting example, where the desired product is sodium sulfite which results from the reaction between sodium carbonate and $SO_2$, unconverted sodium carbonate which may be present in the liquor prior to entering the crystallizer 20 may liberate carbon dioxide in the crystallizer and, in the absence of liquor decarbonation, this liberated carbon dioxide would cavitate the crystallizer circulation pump 25. This cavitation would result in a reduced flow rate in the circulation pump 25 through the heater 30 and leads to frequent fouling of the heater 30 with sodium sulfite crystals. According to the present invention however, the sparging and/or heating of the liquor prior to its entry in the crystallizer 20 will assist in the removal of $CO_2$ from the liquor containing sodium sulfite and thus will minimize the cavitation of the crystallizer circulating pump 25.

The decarbonated liquor, that is to say which is leaner in $CO_2$ content, exiting the decarbonation unit 15 is thus directed (e.g., pumped or gravity fed) to the crystallizer 20 via line 16.

Under suitable operating conditions, water in the liquor is evaporated. At the same time, crystals of the desired alkali product are formed in the crystallizer 20 and are removed from the crystallizer 20 by withdrawal of a crystal slurry in line 21. The crystal slurry containing crystals of the desired alkali product can then be sent to a drying unit (e.g., rotary dryer)—not shown—where the crystals can be dried.

If the evaporator crystallizer temperature is higher than that of the liquor feeding the crystallizer 20 via line 16, then it is likely that more gaseous carbon dioxide would be liberated in the crystallizer 20 as well as in the circulation loop 35.

The present invention additionally offers a solution to this additional $CO_2$ release, by providing a decarbonation method for removing $CO_2$ in one or more circulation loops connected to the crystallizer 20, and thus preventing the accumulation of $CO_2$ within the various equipment of the crystallization system. These embodiments are illustrated in FIGS. 2-5 and described below.

Figure 2:
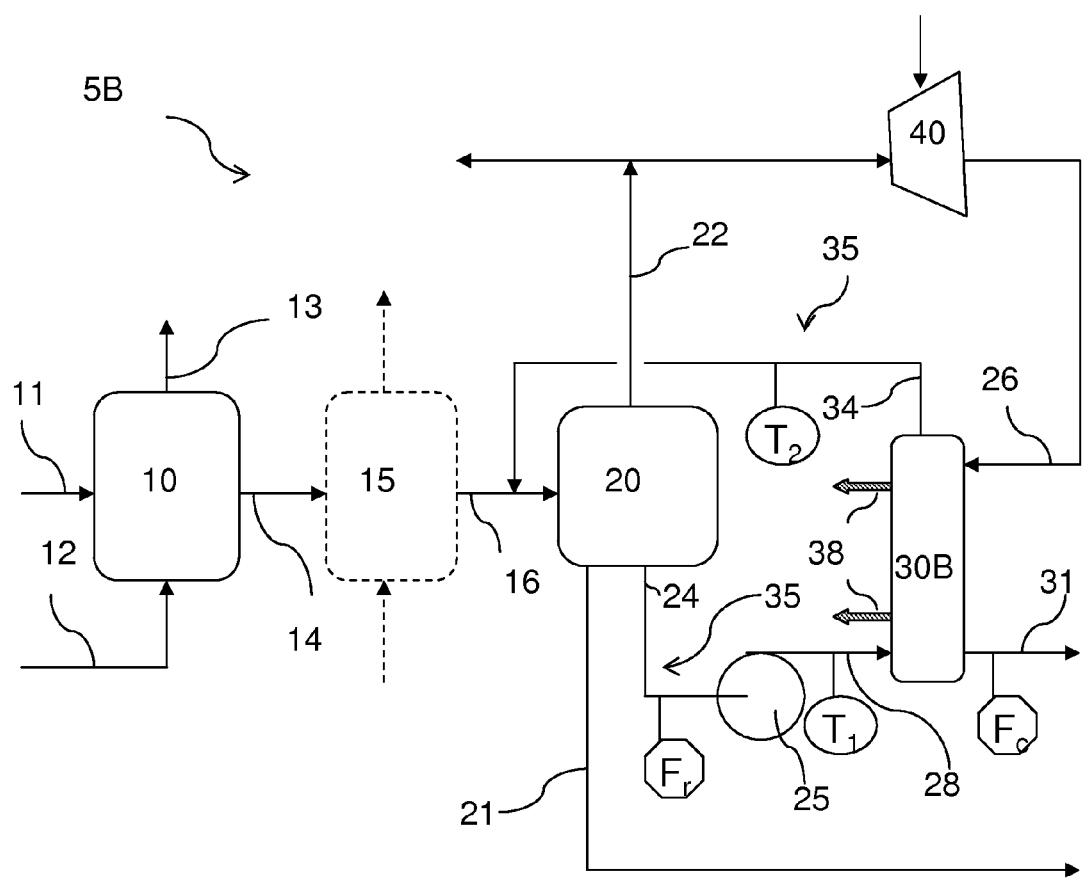
FIG. 2 illustrates a process flow diagram of a second embodiment of a process for making an alkali product, wherein the process includes a decarbonation step being carried out in a crystallizer heater circulation loop which is connected to a crystallizer.

FIG. 2 is a schematic process flow diagram which comprises an apparatus 5B for carrying out the manufacture of a desired crystalline product. The system 5B comprises the reactor 10, an optional decarbonation unit 15, a crystallization system comprising a crystallizer 20, a circulation pump 25 and a crystallizer heater 30B, the circulation pump 25 and the crystallizer heater 30B being located in a first circulation loop 35. The first circulation loop 35 is in fluid communication at both ends with the crystallizer 20. The description of the units 10, 15, 20, and 25 and their operation are the same as previously described in relation to FIG. 1.

The system 5B differs from system 5A of FIG. 1 in that the crystallizer system in FIG. 2 is further equipped with an energy efficiency recompressing unit 40. For example, some of the sodium sulfite evaporative crystallizers may be designed for improved energy efficiency by recompressing the steam generated from the crystallizer to recover the energy for use in the crystallizer heater 30B. This is the function that the recompressing unit 40 can perform in system 5B. The recompressing unit 40 compresses, at least in part, the steam generated in the crystallizer 20 and exiting in line 22, in order for at least a portion of the recompressed steam to be directed to the crystallizer heater 30B via line 26 to recover the energy for boiling.

To that effect, the recompressing unit 40 is in fluid communication with the steam outlet of the crystallizer 20 and the steam inlet of the heater 30B. The recompressing unit 40 is adapted to compress make-up steam and the steam effluent exiting the crystallizer 20 via the crystallizer steam outlet and to direct the compressed steam to the shell side of the crystallizer heater 30B.

In the case of evaporative crystallization using vapor recompression, a technique of venting the condensing side of the crystallizer heater 30B may be used to control the accumulation of carbon dioxide within the crystallization system. The crystallizer heater 30B thus also comprises additional venting outlets 38, which are adapted to pass excess $CO_2$ out of the heater 30B.

Indeed, the crystallizer heater 30B in the form of a shell-and-tube exchanger can be equipped with one or more vent nozzles 38 on the bottom of the shell side to vent the exchanger. The flow rate of the crystallizer circulation pump 25 can be monitored to ensure sufficient venting. The circulation pump flow rate is monitored indirectly by using a flow instrument to measure the heater condensate flow rate ($F_c$) in line 31 and also by using instruments which measure the temperature on the inlet $T_1$ (e.g., in line 28) and outlet $T_2$ (e.g., in line 34) of the liquor side of the heater 30B. A circulation pump flow rate ($F_r$) in line 24 can be calculated for these readings and physical property data for the fluids.

In a typical albeit non-limiting example, the circulation flow rate ($F_r$) may be from 35,000 to 50,000 gallons per minute (GPM) or about 132,000-190,000 liters per minute (L/min). A reduced flow rate ($F_r$) below 30,000 GPM (or below 103,500 L/min) would indicate exchanger fouling or pump cavitation due to excess $CO_2$ being liberated from the crystallizer liquor. Condensate flow rates ($F_c$) of 150 GPM (or about 570 L/min) would indicate good circulation. Condensate flow rates ($F_c$) below 120 GPM (or below 454 L/min) may indicate possible pump cavitation. This method of measuring the flow rate does not require the presence of any additional moving part in the crystallization feed liquor, which could otherwise be sensitive to fouling. The liquor feed flow is not perturbed. Additionally, the condensate flow rate ($F_c$) can be measured in a very precise and stable way. Furthermore, the temperature sensors on the liquor inlet and outlet of the heater 30B provide reliable and effective indicators in determining poor circulation pumping rates. For example, a process side temperature difference from 1° F. to 2.5° F. (or from 0.56 to 1.39° C.) is indicative of good circulation flow rates, while a process side temperature difference of between 3° F. to 4° F. (or from 1.67 to 2.22° C.) is indicative of poor pumping rates caused by fouling and/or pump cavitation.

Thus the method according to the present invention may further comprise monitoring the flow rate of the condensate exiting the crystallizer heater and monitoring the temperatures of the circulating liquor entering and exiting the crystallizer heater, and when the condensate flow rate decreases by a pre-determined amount (e.g., 30 GPM) or when the condensate flow rate is below a threshold value, or when the difference in the liquor temperatures at the crystallizer heater inlet and outlet exceeds a threshold limit (e.g., 3 or 4° F.), then the method further comprises increasing the amount of carbon dioxide removed from the liquor during decarbonation. Increasing the amount of carbon dioxide removed from the liquor may be carried out by increasing the rate of $CO_2$ removal during decarbonation or increasing the residence time of the liquor in the decarbonation unit 15.

For example, when there is an indication of circulating pump cavitation, some short-term approaches for remedy to this problem may be as follows:
  reducing the crystallizer feed rates to reduce the $CO_2$ loading;
  increasing the flow rate of the sparging gas (e.g., air and/or steam) either in various upstream vessels and/or in transfer piping;
  adjusting the pre-heating step to provide a greater increase in liquor temperature after the liquor exits the reactor 10;
  adjusting the expanding step to provide a greater drop in liquor pressure after the liquor exits the reactor 10;
  increasing the reactor temperature; or
  any combinations of these techniques thereof.

Longer term approaches to remedy to and/or to prevent equipment fouling may include checking the proper operation of the gas distribution system in the decarbonation unit 15, e.g., inspecting spargers or nozzles for plugged gas passages; checking the proper operation of the circulation pump 25, e.g., inspecting the circulation pump impeller for wear, and checking tubes of the shell-and-tube heater (30 or 30B) for fouling and decreased heat transfer surface which would cause poor heating.

Figure 3:
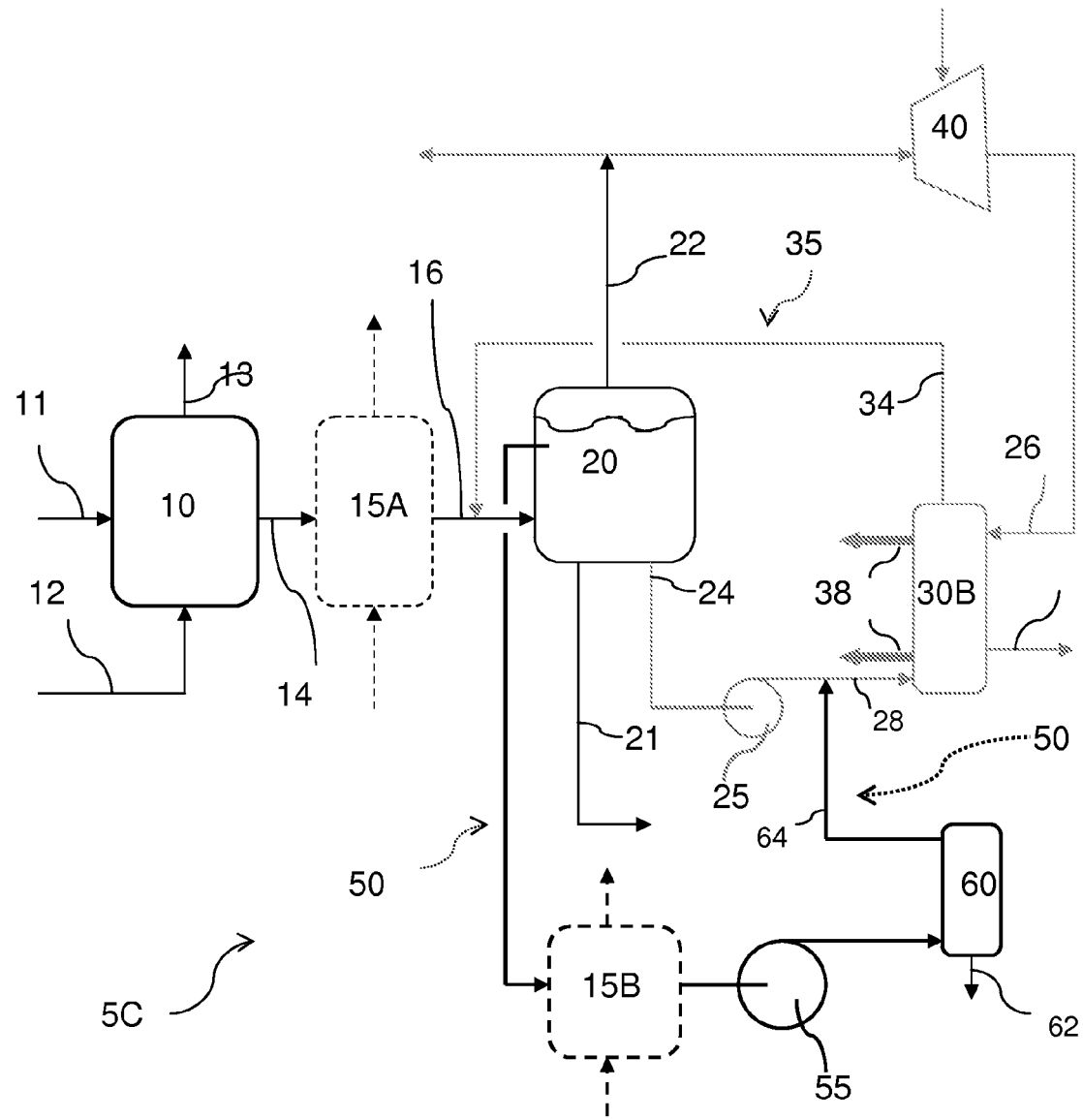
FIG. 3 is a representative process flow diagram of a third embodiment of a process for making an alkali product, wherein the process includes a decarbonation step being carried out in a filter circulation loop which is connected to a crystallizer.

FIG. 3 is a schematic process flow diagram which comprises an apparatus 5C for carrying out the manufacture of a desired crystalline product. Similarly to FIG. 2, the system 5C comprises the reactor 10, an optional decarbonation unit 15A, the crystallization system comprising the crystallizer 20, the circulation pump 25, the crystallizer heater 30B and the recompressing unit 40, wherein the description of these units 10, 15A, 20, 30B, 35, 40 and their operation are the same as the units 10, 15 or 15A, 20, 30 or 30B, 35, 40 previously described in relation to FIGS. 1 and/or 2. The crystallization system in the system 5C differs from the systems 5A and 5B in that it comprises a second circulation loop 50, also known as 'filter circulation loop'.

The filter circulation loop 50 comprises an optional decarbonation unit 15B, a (second) circulation pump 55, and a filtration unit 60, wherein the optional decarbonation unit 15B is preferably disposed upstream of the circulation pump 55.

The filtration unit 60 may comprise one or more filters operated in series or in parallel. Preferably, the filtration unit 60 comprises two or more filters. The operation of these filters may be in alternating mode. For example, a filter may be operating while the other is being changed out or cleaned. In such instances, the liquor exiting circulation pump 55 may be switched from one filter to another after a certain period of time (e.g., 24 to 36 hours). The filtration unit 60 preferably comprises two or more dead-end filters, in which insoluble material is collected. The used-up filter is drained after operation and then washed with water. The wash water containing insoluble material is then disposed of. The filtration unit 60 is preferably configured to provide a filtrate to the crystallizer heater 30B.

The operation of the filter (or second) circulation loop 50 may be facilitated by the operation of the decarbonation unit 15B, wherein any of the decarbonation techniques described above may be employed. This removal of $CO_2$ from the liquor fed to the filtration unit 60 can also eliminate causes of cavitation in pump 55, and clogging in the transfer pipes within the loop 50.

The optional decarbonation unit 15B is preferably in fluid communication with the crystallizer 20 and the filtration unit 60. The optional decarbonation unit 15B may be a holding vessel or a feed tank in which overflow liquor accumulates before being directed to the unit 60.

The operation of the loop 50 may be described as follows. Inside the crystallizer 20 may be disposed a "settling ring", which provides a quiet zone in which crystals settle out of the liquor. The liquor leaner in crystals then overflows out of the crystallizer to the filter circulation loop 50. The liquor overflow may be directed to a filter feed holding vessel before being pumped to the filtration unit 60. The holding vessel may serve as the decarbonation unit 15B, in which case the filter feed holding vessel may be equipped with a sparger configured to inject a sparging gas (e.g., compressed air, steam or a combination of both), so that the sparging gas can strip $CO_2$ from the liquor. The filter feed holding vessel is also vented to remove the sparging gas carrying some $CO_2$. The liquor is then pumped from this filter feed holding vessel to one or more filters in the filtration unit 60. The filter(s) may be removing insoluble matter via line 62, such as silica and calcium compounds in the case of a crystalline sodium sulfite manufacture process—to reduce the insoluble concentration in the filtrate exiting each filter via line 64 to below 50 parts per millions (ppm). The filtrate exiting one or more filters is returned back to the crystallizer 20. The filtrate in line 64 may be first passed through the crystallizer heater 30B (via line 28, as shown in FIG. 3) before being returned to the crystallizer 20.

Figure 4:
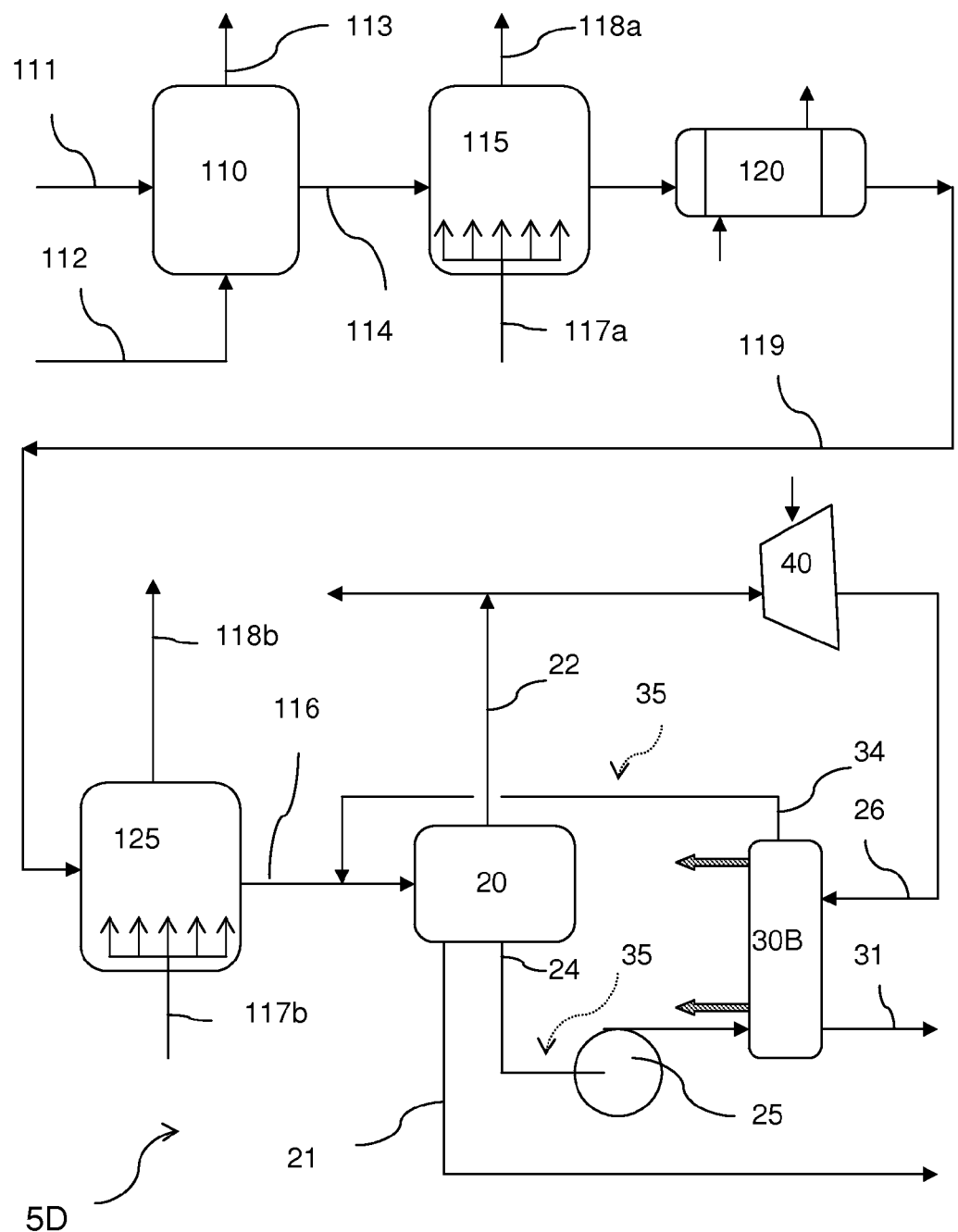
FIG. 4 is a representative process flow diagram of a fourth embodiment of a process for making crystalline sodium sulfite, the process including forming a sodium sulfite liquor, forming crystals of sodium sulfite in a crystallization system, and decarbonating the sodium sulfite liquor using one or more decarbonation techniques, wherein the crystallization system comprises a circulating loop.

FIG. 4 is another schematic process flow diagram which comprises an apparatus 5D for carrying out the manufacture of a crystalline sodium sulfite product. Similarly to FIG. 2, the system 5D comprises a reactor 110 and a crystallization system comprising the crystallizer 20, the circulation pump 25, the crystallizer heater 30B and the recompressing unit 40, wherein the description of these units 110, 20, 30B, 35, 40 and their operation are the same as the units 10, 20, 30 and/or 30B, 35, 40 previously described in relation to FIGS. 1 and/or 2. The system 5D also comprises a feed tank 115, a liquor pre-heater 120 and a surge tank 125, each of which may be operated as one or more decarbonation units as described in FIGS. 1 & 2 in relation to decarbonation unit 15 or 15A.

Figure 5:
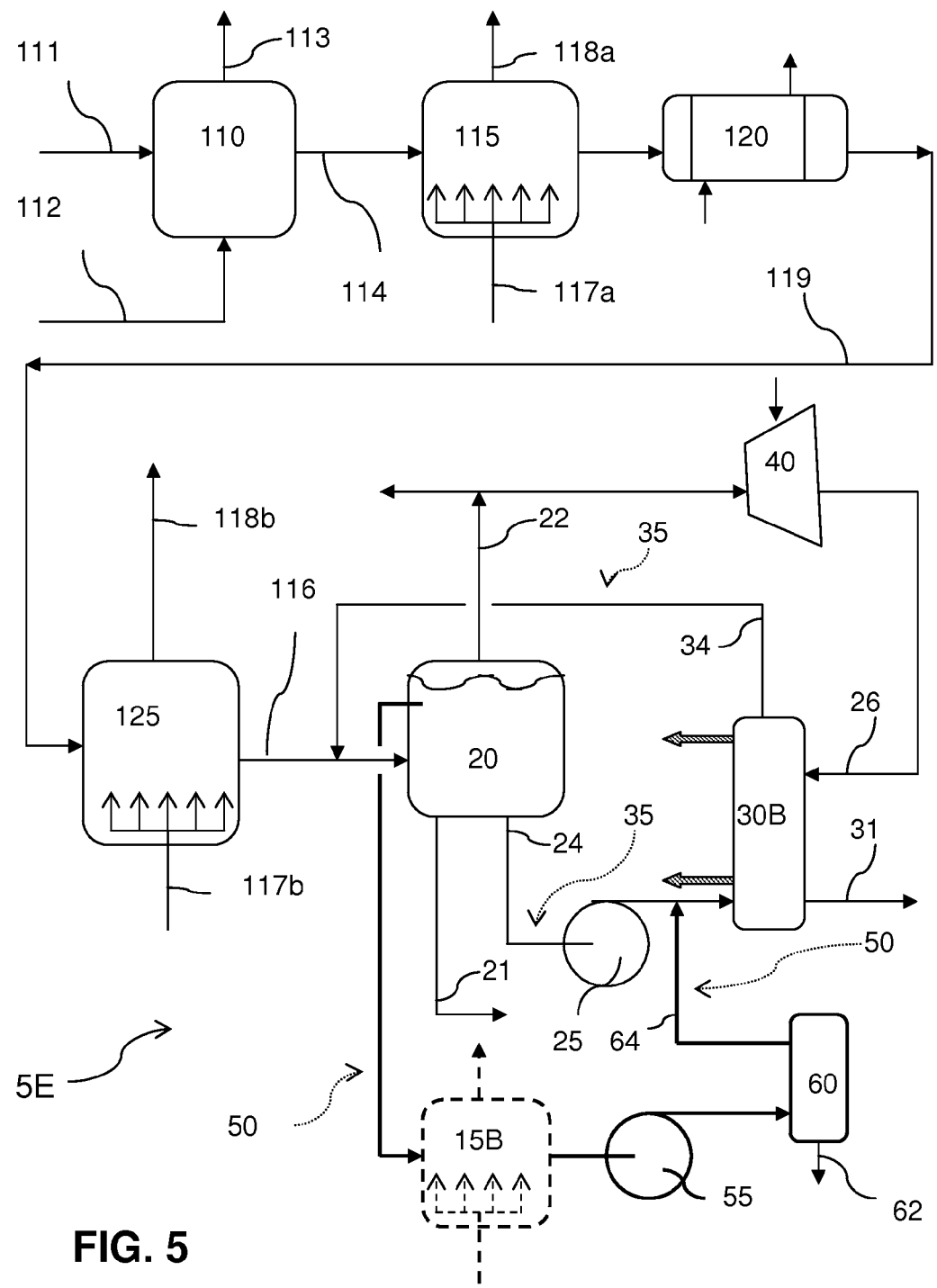
FIG. 5 is a representative process flow diagram of a fifth embodiment of a process for making a sodium sulfite, the process including forming a sodium sulfite liquor, forming crystals of sodium sulfite in a crystallization system, and decarbonating the sodium sulfite liquor by one or more decarbonation techniques, wherein the crystallization system comprises two circulating loops.

The crystallization system may further comprise a filter (or second) circulation loop 50 as previously described in FIG. 3. Such embodiment is illustrated in FIG. 5.

Referring again to FIG. 4, the operation of system 5D will now be described for the manufacture of crystalline sodium sulfite.

In a brief overview, a source of sodium carbonate (e.g., via line 111) with a source of sulfur dioxide (e.g., via line 112) are fed to the reactor 110 under conditions suitable to produce sodium sulfite with carbon dioxide as a by-product and generate a sodium sulfite liquor which exits reactor 10 via line 114. The reactor 110 is typically operated at a temperature from 120° F. to 140° F. (from 48.9 to 60° C.), or at about 160° F. (about 71° C.).

Although $SO_2$ and $Na_2CO_3$ are the major reactants in lines 111 and 112 fed to the reactor 110, the following sulfite reactions in reactor 110 are believed to occur:

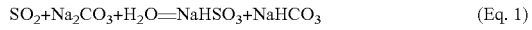

$$SO_2+Na_2CO_3+H_2O=NaHSO_3+NaHCO_3 \quad \text{(Eq. 1)}$$

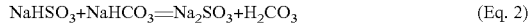

$$NaHSO_3+NaHCO_3=Na_2SO_3+H_2CO_3 \quad \text{(Eq. 2)}$$

In considering the reaction kinetics, the $H_2CO_3$ term may be treated as a constant, dependent upon the ability of the $H_2CO_3$ to disassociate into $H_2O$ and $CO_2$ to leave the system. An increase in reactor temperature drives the reaction equilibrium of Eq. 2 towards desired product formation. Moving the equilibrium to the right reduces the quantity of sodium bisulfite and sodium bicarbonate present in the liquor and liberates carbon dioxide. Since Applicants have observed the presence of sodium carbonate and sodium bicarbonate in the reactor liquor, there is an indication that the reaction does not go to completion. The content of the reactor is usually at a pH of between 7.4 to 7.7, or preferably about 7.6, which is much lower pH than that of pure sodium sulfite solution. At these lower pH values, it is likely that sodium bisulfite is also present in the liquor.

The reactor product in line 114 may include sodium sulfite in an amount of from 19 to 26.5 wt. %; or about 24 wt. %; sodium bisulfite in an amount of from 0.1 to 1.1% wt. %; or about 1 wt. %; sodium carbonates in an amount of from 0.1% to 4 wt. %, or about 3 wt. %; and the remaining balance is water in an amount of from 68.5 to 80 wt. %; or about 72 wt. %. The carbonate compounds can exist as carbonate, bicarbonate or carbonic acid depending on the pH of the liquor. The reactor liquor is directed to a crystallizer feed tank 115 at a flow rate from 45,000 pounds per hour (lb/hr) to 80,000 lb/hr, or from 20,400 kilograms per hour (kg/hr) to 36,300 kg/hr. The transfer of the reactor liquor to tank 115 may be made by overflow or by pump.

A stripping gas 117a (e.g., steam ranging in pressure between 25 and 75 psig (about 274–618 kPa); or at about 35 psig (about 343 kPa); air ranging in pressure between 60 and 120 psig (about 515–930 kPa); or at about 100 psig (about 791 kPa); or mixtures thereof) is injected into the feed tank 115 and sparged through the liquor contained herein, so that carbon dioxide and unreacted $SO_2$ are vented out and exit the feed tank 115 via line 118a.

The feed tank 115 may be equipped with a (first) gas distribution system (e.g., nozzle) configured to deliver the stripping gas into the liquor disposed inside the tank 115. The (first) gas distribution system is generally disposed below the level of the liquor in the tank 115. A source of the (first) stripping gas is fed via line 117a into the tank 115 through the gas distribution system forcing the gas upward through the liquor to finally exit the tank 115 via line 118a. The stripping gas displaces some of the carbon dioxide from the liquor and carries it out of the tank 115. For example, steam (e.g., at 35 psig or 343 kPa) or air (e.g., at 100 psig or 791 kPa pressure) may be fed into the tank 115 through a plurality of nozzles or through a sparger forcing the steam or air through the liquor until it exits the tank 115 via line 118a carrying with it the displaced $CO_2$. The feed tank 115 is generally equipped with a vent that allows the stripping gas and the liberated carbon dioxide to exit the tank.

When the stripping gas 117a comprises steam, the condensing steam further heats up the liquor, thus reducing the solubility of carbon dioxide, and liberates more $CO_2$. As non-limiting examples, when steam is used as the stripping gas 117a, the flow rate of steam may range from 250 lb/hr and 750 lb/hr (or from 113 kg/hr to 340 kg/hr) to effect an increase in sodium sulfite solution temperature by at least 5° F. (or 2.8° C.); or if a flow rate of about 500 lb/hr of steam (or 227 kg/hr) is used, there is an increase in the sodium sulfite solution temperature of about 10° F. (or 5.6° C.). The increase in liquor temperature in unit 115 is being measured using as the basis, the temperature of the liquor in line 114 exiting reactor 10. Optionally, a stream of air or a gas stream comprising a mixture of air and steam may also be sparged into the feed tank 115.

The sodium sulfite liquor exiting tank 115 is then directed, e.g., pumped via a pump (not illustrated), through a feed pre-heater 120 to increase the liquor temperature by at least 5° F. (or by at least 2.8° C.), or between about 15° F. to 30° F. (or from 8.3 to 16.7° C.) to further reduce the solubility of $CO_2$. The increase in liquor temperature in pre-heater 120 is being measured using as a basis, the temperature of the liquor exiting tank 115. With the use of higher liquor flow rates, there is a lower heat transfer rate and thus there is a lower increase in temperature of the sodium sulfite liquor. The preheated sodium sulfite liquor exiting the feed pre-heater 120 may have a temperature between 145° F. and 175° F. (or between 62.8 and 79.4° C.).

The liquor pre-heater 120 is effective in heating up the liquor by at least 5° F. (or by at least 2.8° C.), preferably approximately from 15° F. up to 30° F. (or from 8.3 to 16.7°

C.) at lower feed flow rates. The increase in liquor temperature further reduces the carbon dioxide solubility and displaces the carbon dioxide out of solution thus liberating additional gaseous carbon dioxide. Any heat transfer medium can be used in the feed pre-heater 120. A preferred heat transfer medium is steam or any hot fluid which has a temperature greater, preferably at least 5° F. greater (or at least 2.8° C. greater) than the liquor entering the feed pre-heater 120.

The pre-heated sodium sulfite liquor exiting the liquor pre-heater 120 may then be fed to the crystallizer feed surge tank 125. An additional stripping gas 117b may be sparged into the sodium sulfite liquor disposed in tank 125. A source of the stripping gas 117b may be the same or different than the stripping gas 117a which may be used in the feed tank 115. The stripping gas 117b may comprise steam ranging in pressure between 25 and 75 psig (about 274–618 kPa); or at about 35 psig (about 343 kPa); or may comprise air ranging in pressure between 60 and 120 psig (about 515–930 kPa); or at about 100 psig (about 791 kPa); or any mixtures thereof. Additional liberated gaseous $CO_2$ may be vented out of the feed surge tank 125 via line 118b.

The feed surge tank 125 may be equipped with a gas inlet and with a (second) gas distribution system (e.g., nozzle(s), sparger) which is connected to the gas inlet. The (second) gas distribution system may be configured to inject the additional (or second) stripping gas into the liquor disposed inside the surge tank 125, and is generally disposed below the level of the liquor in the tank 125. The (second) stripping gas is preferably fed via line 117b into the surge tank 125 through the (second) gas distribution system forcing the gas upward through the liquor to finally exit the tank 125 via line 118b. The stripping gas displaces some of the carbon dioxide from the liquor inside surge tank 125 and carries it out of the surge tank 125. The (second) gas distribution system provides a more efficient distribution of the stripping gas in order to improve its effectiveness in displacing the $CO_2$ out of the liquor. As a non-limiting example, steam (e.g., at 35 psig or 343 kPa) or air (e.g., at 100 psig or 791 kPa) may be fed into the surge tank 125 through a plurality of nozzles or a sparger forcing the steam or air through the liquor until it exits the surge tank 125 via line 118b carrying with it the displaced $CO_2$. The surge tank 125 is generally equipped with a gas vent that allows the (second) stripping gas and the liberated carbon dioxide to exit the tank.

Additionally or alternatively, the (second) stripping gas may be added to a transfer pipe (e.g., line 119) in fluid relation with the liquor inlet of the crystallizer feed surge tank 125. For example, about 100 scfm (or 2,832 standard liters per minute) of compressed air at 100 psig (or about 791 kPa) may be added into the transfer piping at the liquor inlet to the crystallizer feed surge tank 125 to provide additional stripping.

When the feed surge tank 125 comprises fiberglass walls, which have a 180° F. (82.2° C.) temperature limit, there may be some heat loss through the fiberglass tank walls, which in turn may cause the temperature of the liquor stored herein to decrease by about 5° F. (or by 2.8° C.). Optionally, when the feed surge tank 125 is an insulated steel walled tank, the sodium sulfite liquor in the feed surge tank 125 could be maintained as high as 190° F. (87.8° C.).

The sodium sulfite liquor is then directed, e.g., pumped via a pump (not illustrated) to the crystallizer 20. The crystallizer 20 preferably comprises an evaporative crystallizer. The evaporative crystallizer 20 is operated at a temperature of from 195° F. to 205° F. (about 90.5-96.1° C.), or of from 198° F. to 200° F. (about 92.2-93.3° C.) under a vacuum of from 2 inches Hg to 14 inches Hg (or from 2.8 to 47.4 kPa), or of about 6 inches Hg (or about 20.3 kPa), where the sodium sulfite is crystallized. When the crystallizer 20 is operated at 6 inches Hg vacuum (or about 20.3 kPa), the crystallizer temperature is generally from 195° F. to 200° F. (or about 90.5-93.3° C.). When the crystallizer operates under 2 inches Hg vacuum (or about 2.8 kPa), the crystallizer temperature will be near 205° F. (or about 96.1° C.). When the crystallizer operates under 14 inches Hg (or about 47.4 kPa), the crystallizer temperature will be near 185° F. (or about 85° C.). These sodium sulfite crystals are removed from the crystallizer and dried in a rotary dryer (not shown). A hot gas (e.g., steam, air, nitrogen or mixtures of two or more thereof) may optionally be sparged into a crystallizer filter loop liquor (shown in FIG. 5) for example, at the crystallizer exit, such as described earlier in FIG. 3 in the context of the decarbonation unit 15B disposed in the second circulation loop 50.

Optionally, the sodium sulfite liquor passing through any piping between the liquor outlet of reactor 110 and the liquor inlet of crystallizer 20 may be flashed using an expander, a barometric condenser, a venturi, a spray nozzle, or other vacuum source to release additional $CO_2$.

The feed liquor which has been subjected to one or more decarbonation steps in feed tank 115, in fee pre-heater 120 and in surge tank 125 is then transferred to the crystallizer 20 where water from the liquor is evaporated to produce sodium sulfite crystals which exit the crystallizer 20 via line 21.

It should be understood that any description, even though described in relation to a specific embodiment or drawing, is applicable to and interchangeable with other embodiments of the present invention.

One or preferably more decarbonation techniques may be used in combination to achieve adequate decarbonation of the sodium sulfite liquor before it is introduced into the sulfite crystallizer. The following decarbonation techniques for decarbonating the sodium sulfite liquor feed to the crystallizer may be incorporated, either individually or in any combination, in various embodiments of the present invention:

1. direct injecting of a hot gas (e.g., steam) into the liquor to increase feed temperature;
2. preheating crystallizer feed liquor to increase its temperature while in transit from the reactor to the crystallizer;
3. addition of a compressed gas (e.g., air) into transfer piping and venting;
4. direct injecting of a stripping gas (e.g., steam and/or air) into the liquor via a gas distribution system (e.g., sparger) into a process vessel upstream of the crystallization system and also preferably downstream of the reactor which generates the liquor and venting the process vessel;
5. letting down the pressure of the liquor while in transit from the reactor to the crystallizer;
6. monitoring the flow rate of the crystallizer circulation pump by measuring the condensate flow as well as the heater inlet and outlet fluid temperatures;
7. direct injecting of a hot gas (e.g., steam) into the liquor passing through or exiting the crystallizer circulation filter loop;
8. venting of the condensing side of the crystallizer heater.

The invention may have other application in crystallization operations where traces of a liquor component (such as unreacted gas or byproduct or end product) may be present in the crystallization feed liquor can cause fouling problems in the crystallization equipment and/or cavitation of circulation pump. All crystallizer operators can benefit from the technique of circulation pump flow rate monitoring by the described technique, due to its high accuracy and stability. More particularly, the present invention may be implemented in other crystallization processes that use sulfur dioxide in the feed stream and/or that use a carbonate compound as a reactant.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention. Accordingly, the scope of protection is not limited to the embodiments described herein, but is only limited by the claims that follow, the scope of which shall include all equivalents of the subject matter of the claims.

The invention claimed is:

1. A method for decarbonating a liquor, said liquor comprising carbon dioxide ($CO_2$) and a desired alkali product, said liquor serving as a feed to a crystallization system for forming crystals of said desired alkali product, said crystallization system comprising a crystallizer, a crystallizer heater in a first circulation loop connected to said crystallizer, a circulation pump, and optionally a filter in a second circulation loop connected to said crystallizer or said crystallizer heater, the method comprising reacting two reactants, one of which comprises a carbonate compound, under conversion promoting conditions in a reactor to form a desired alkali product and $CO_2$ so as to generate a liquor comprising the desired alkali product and at least a portion of the formed $CO_2$, said liquor having a temperature and a pressure when exiting said reactor; and performing at least one decarbonation technique selected from the group consisting of:

a) passing a stripping gas through the liquor or a portion thereof to remove at least a portion of said $CO_2$ in order to decrease the $CO_2$ content of said liquor, so as to form a vent gas comprising $CO_2$, wherein the stripping gas excludes sulfur dioxide, the step (a) being carried out prior to loading the liquor into the crystallizer, or while passing the liquor through the first circulation loop, through the second circulation loop, or through both;

b) increasing the temperature of said liquor by 5° F. or more, the step (b) being carried out prior to loading the liquor into the crystallizer, or while passing the liquor through the first circulation loop, through the second circulation loop, or through both;

c) decreasing the pressure of said liquor, the step (c) being carried out prior to loading the liquor into the crystallizer, or while passing the liquor through the first circulation loop, through the second circulation loop, or through both;

d) venting a condensing side of the crystallizer heater, while passing the liquor through the first circulation loop; and e) any combinations of two or more of these techniques.

2. The method according to claim 1, wherein the desired alkali product in the liquor is sodium sulfite.

3. The method according to claim 1, wherein the stripping gas in step (a) comprises steam, air, or any mixtures thereof.

4. The method according to claim 1, wherein the step (a) is carried out by injecting a stripping gas into a transfer pipe containing at least a portion of the liquor, such transfer pipe being in fluid communication with at least one of the following equipment: a liquor feed tank, a liquor surge tank; the crystallizer; the crystallizer heater; the filter; or a circulation pump in the first or second circulation loop.

5. The method according to claim 1, wherein the step (a) is carried out by injecting a stripping gas into a vessel containing at least a portion of the liquor.

6. The method according to claim 1, wherein the step (b) is carried out to increase the liquor temperature to a temperature not exceeding a saturation point.

7. The method according to claim 1, wherein the step (b) is carried out by performing a technique selected from the group consisting of:
heating the liquor in a liquor pre-heater;
passing a hot gas through the liquor;
heating the liquor in a liquor pre-heater, and then passing a hot gas through the liquor; and
passing a hot gas through the liquor, and then heating the liquor in a liquor pre-heater.

8. The method according to claim 1, further comprising
monitoring a circulation flow rate of the liquor in the first circulation loop and the temperatures of the liquor entering and exiting the crystallizer heater;
comparing the circulation flow rate and the difference in these temperatures within their respective pre-determined ranges of values; and
when the circulation flow rate and/or the difference in these temperatures are not within their respective pre-determined ranges, performing more than one decarbonation step chosen from steps (a) to (d), or increasing the rate of decarbonation while performing any decarbonation chosen from steps (a) to (d),
the step of increasing the rate of decarbonation being carried out by a technique selected from the group consisting of:
increasing the flow rate of the stripping gas in step (a);
increasing the heat transfer rate in step (b);
increasing the pressure drop in step (c);
increasing the flow rate of the venting of the condensing side in step (d); and
any combinations of two or more of these techniques.

9. A process for producing a crystalline metal sulfite, comprising providing a liquor comprising a metal sulfite and $CO_2$, and carrying out the method for decarbonating of said liquor according to claim 1,
in which the process further comprises:
loading the liquor in the crystallizer under conditions suitable to form metal sulfite crystals;
passing at least a portion of the liquor disposed in said crystallizer through the crystallizer heater in the first circulation loop to form a recycled heated liquor which is returned, at least in part, to said crystallizer and to form a condensate which exists said first circulation loop; and
removing metal sulfite crystals from the crystallizer.

10. The process for producing a crystalline metal sulfite according to claim 9, wherein the step of providing the liquor comprises reacting an aqueous solution of a metal carbonate with sulfur dioxide under conversion promoting conditions to form a desired metal sulfite and carbon dioxide ($CO_2$) so as to generate the liquor comprising the formed metal sulfite and at least a portion of said formed $CO_2$.

11. A method for minimizing pump cavitation in a circulation pump in a crystallization system for the production of a desired crystalline alkali product from a liquor comprising an undesirable component being able to be released as gas under crystallization conditions, said method comprising carrying out the method for decarbonating the liquor according to claim 1.

12. A method for minimizing fouling of a crystallizer heater in a circulation loop of a crystallization system for the production of a desired crystalline alkali product from a liquor comprising an undesirable component being able to be released as gas under crystallization conditions, said method comprising carrying out the method for decarbonating the liquor according to claim 1.

13. A method for producing sodium sulfite, comprising:
 reacting an aqueous solution of sodium carbonate with sulfur dioxide under process conditions to form a reaction product comprising a sodium sulfite liquor;
 introducing the sodium sulfite liquor into a feed tank;
 performing at least one decarbonation technique to form a decarbonated liquor;
 introducing the decarbonated sodium sulfite liquor into a sodium sulfite evaporative crystallizer;
 circulating liquor through a crystallizer heater in a crystallizer circulation loop;
 venting a condensing side of the crystallizer heater; and
 removing sodium sulfite crystals from the crystallizer,
 wherein the decarbonation technique is selected from the group consisting of:
 a) introducing a stripping gas comprising steam, air or mixtures thereof into the sodium sulfite liquor in the feed tank, and venting carbon dioxide from the feed tank;
 b) heating the sodium sulfite liquor;
 c) decreasing the pressure of the sodium sulfite liquor; and any combinations of two or more of these techniques.

14. The method for producing sodium sulfite of claim 13 further comprising injecting compressed air into a sodium sulfite liquor transfer pipe feeding into said feed tank.

15. The method for producing sodium sulfite of claim 13 further comprising monitoring the flow rate of a condensate exiting the crystallizer heater and monitoring the temperatures of the recirculating liquor entering and exiting the crystallizer heater, and when the condensate flow rate decreases by a pre-determined amount or when the difference in these temperatures exceeds a threshold limit, then the method further comprises increasing the amount of carbon dioxide removed from the liquor during the decarbonation step.

16. A method for producing sodium sulfite, comprising:
 reacting an aqueous solution of sodium carbonate with sulfur dioxide under process conditions to form a reaction product comprising a sodium sulfite liquor comprising carbon dioxide;
 introducing the sodium sulfite liquor into a feed tank;
 performing at least one decarbonation technique to form a decarbonated liquor;
 introducing the decarbonated sodium sulfite liquor into a crystallizer;
 circulating liquor through a crystallizer heater in a crystallizer circulation loop;
 venting a condensing side of the crystallizer heater;
 removing sodium sulfite crystals from the crystallizer;
 monitoring the flow rate of a condensate exiting the crystallizer heater and monitoring the temperatures of the circulating liquor entering and exiting the crystallizer heater; and
 when the condensate flow rate decreases by a pre-determined amount or when the difference in these temperatures exceeds a threshold limit, then the method further comprises increasing the amount of carbon dioxide removed from the liquor during the decarbonation step.

17. The method according to claim 2, wherein the stripping gas in step (a) comprises steam, air, or any mixtures thereof.

18. The method according to claim 2, further comprising
 monitoring a circulation flow rate of the liquor in the first circulation loop and the temperatures of the liquor entering and exiting the crystallizer heater;
 comparing the circulation flow rate and the difference in these temperatures within their respective pre-determined ranges of values; and
 when the circulation flow rate and/or the difference in these temperatures are not within their respective pre-determined ranges, performing more than one decarbonation step chosen from steps (a) to (d), or increasing the rate of decarbonation while performing any decarbonation step chosen from steps (a) to (d),
the step of increasing the rate of decarbonation being carried out by a technique selected from the group consisting of:
 increasing the flow rate of the stripping gas in step (a);
 increasing the heat transfer rate in step (b);
 increasing the pressure drop in step (c);
 increasing the flow rate of the venting of the condensing side in step (d); and
 any combinations of two or more of these techniques.

19. The method according to claim 11, wherein the desired crystalline alkali product in the liquor is sodium sulfite.

20. The method according to claim 12, wherein the desired crystalline alkali product in the liquor is sodium sulfite.

* * * * *